(12) United States Patent
Hartman

(10) Patent No.: US 7,600,294 B2
(45) Date of Patent: Oct. 13, 2009

(54) CHASSIS FOOT AND OPTIONAL CASTOR ASSEMBLY

(75) Inventor: Corey Hartman, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 259 days.

(21) Appl. No.: 11/533,010

(22) Filed: Sep. 19, 2006

(65) Prior Publication Data

US 2008/0078057 A1 Apr. 3, 2008

(51) Int. Cl.
*B60B 33/00* (2006.01)

(52) U.S. Cl. ............................... 16/30; 16/29; 16/31 A; 16/31 R

(58) Field of Classification Search ............... 16/29, 16/30, 31 A, 31 R, 39; 248/129, 188, 346.11
See application file for complete search history.

(56) References Cited

U.S. PATENT DOCUMENTS

| | | | | |
|---|---|---|---|---|
| 1,171,569 A | * | 2/1916 | Wanda | 16/30 |
| 1,364,351 A | * | 1/1921 | Chason | 16/40 |
| 1,709,972 A | * | 4/1929 | Dibsdale | 16/30 |
| 2,033,510 A | * | 3/1936 | Brayley | 16/24 |
| 2,170,257 A | * | 8/1939 | Yde | 16/31 R |
| 2,800,679 A | * | 7/1957 | Schultz, Jr. | 16/29 |
| 2,911,666 A | * | 11/1959 | Schultz, Jr. | 16/40 |
| 3,326,508 A | * | 6/1967 | Born | 248/346.11 |
| 3,441,974 A | * | 5/1969 | Dean | 16/33 |
| 3,608,127 A | * | 9/1971 | Lewin | 16/30 |
| 3,633,774 A | * | 1/1972 | Lee, William S. | 414/809 |
| 4,060,252 A | * | 11/1977 | Mowery | 280/79.11 |
| 4,409,715 A | * | 10/1983 | Timmer | 29/898.066 |
| 4,422,212 A | * | 12/1983 | Sheiman et al. | 16/29 |
| 4,668,029 A | * | 5/1987 | Maizlish et al. | 312/351.13 |
| 4,674,806 A | * | 6/1987 | Kroon et al. | 312/351.13 |
| 4,719,663 A | * | 1/1988 | Termini | 16/30 |
| 4,824,129 A | * | 4/1989 | Rehrig | 280/79.11 |
| 4,874,209 A | * | 10/1989 | Spitzer et al. | 312/249.9 |
| 5,020,768 A | * | 6/1991 | Hardt et al. | 248/678 |
| 5,136,751 A | * | 8/1992 | Coyne et al. | 16/29 |
| 5,253,389 A | * | 10/1993 | Colin | 16/30 |
| 5,388,792 A | | 2/1995 | Hastings et al. | |
| 5,428,866 A | * | 7/1995 | Aschow | 16/30 |
| 5,524,322 A | * | 6/1996 | Muehlen | 16/29 |
| 5,646,823 A | * | 7/1997 | Amori | 361/695 |
| 5,749,121 A | * | 5/1998 | Loescher | 16/43 |
| 5,801,921 A | * | 9/1998 | Miller | 361/686 |
| 5,896,273 A | * | 4/1999 | Varghese et al. | 361/724 |
| 5,934,639 A | * | 8/1999 | Chiang et al. | 248/346.11 |
| 5,964,513 A | * | 10/1999 | Korinsky et al. | 312/223.2 |

(Continued)

*Primary Examiner*—Victor Batson
*Assistant Examiner*—Roberta Delisle
(74) *Attorney, Agent, or Firm*—Haynes and Boone, LLP

(57) ABSTRACT

A chassis foot and optional castor apparatus includes a chassis foot member. A chassis coupling member is located on the chassis foot member and engageable with a chassis to couple the chassis foot member to the chassis without the use of a tool. A castor coupling member located on the chassis foot member and engageable with a castor to couple the castor to the chassis foot member without the use of a tool. The chassis foot member of the chassis foot and optional castor apparatus may be coupled to a chassis to provide additional stability to the chassis. A castor may be coupled to the chassis foot member to provide additional mobility to the chassis without substantially adding to the height of the chassis including the chassis foot member.

20 Claims, 14 Drawing Sheets

U.S. PATENT DOCUMENTS

| | | | |
|---|---|---|---|
| 5,980,003 A * | 11/1999 | Huang .................... 312/223.2 |
| 6,193,208 B1 | 2/2001 | Schmitt et al. |
| 6,229,698 B1 * | 5/2001 | Harvey ...................... 361/683 |
| 6,311,941 B1 | 11/2001 | Feldmeyer |
| 6,315,445 B1 * | 11/2001 | Mazess et al. ............. 378/196 |
| 6,398,041 B1 * | 6/2002 | Abbott ........................ 211/26 |
| 6,929,337 B2 | 8/2005 | Helot et al. |
| 2003/0094554 A1 * | 5/2003 | Bushey .................. 248/223.41 |
| 2005/0060840 A1 * | 3/2005 | Polevoy et al. ................ 016/26 |
| 2005/0098694 A1 * | 5/2005 | Wetterberg et al. ...... 248/220.21 |
| 2005/0134156 A1 * | 6/2005 | Fan ......................... 312/223.2 |

* cited by examiner

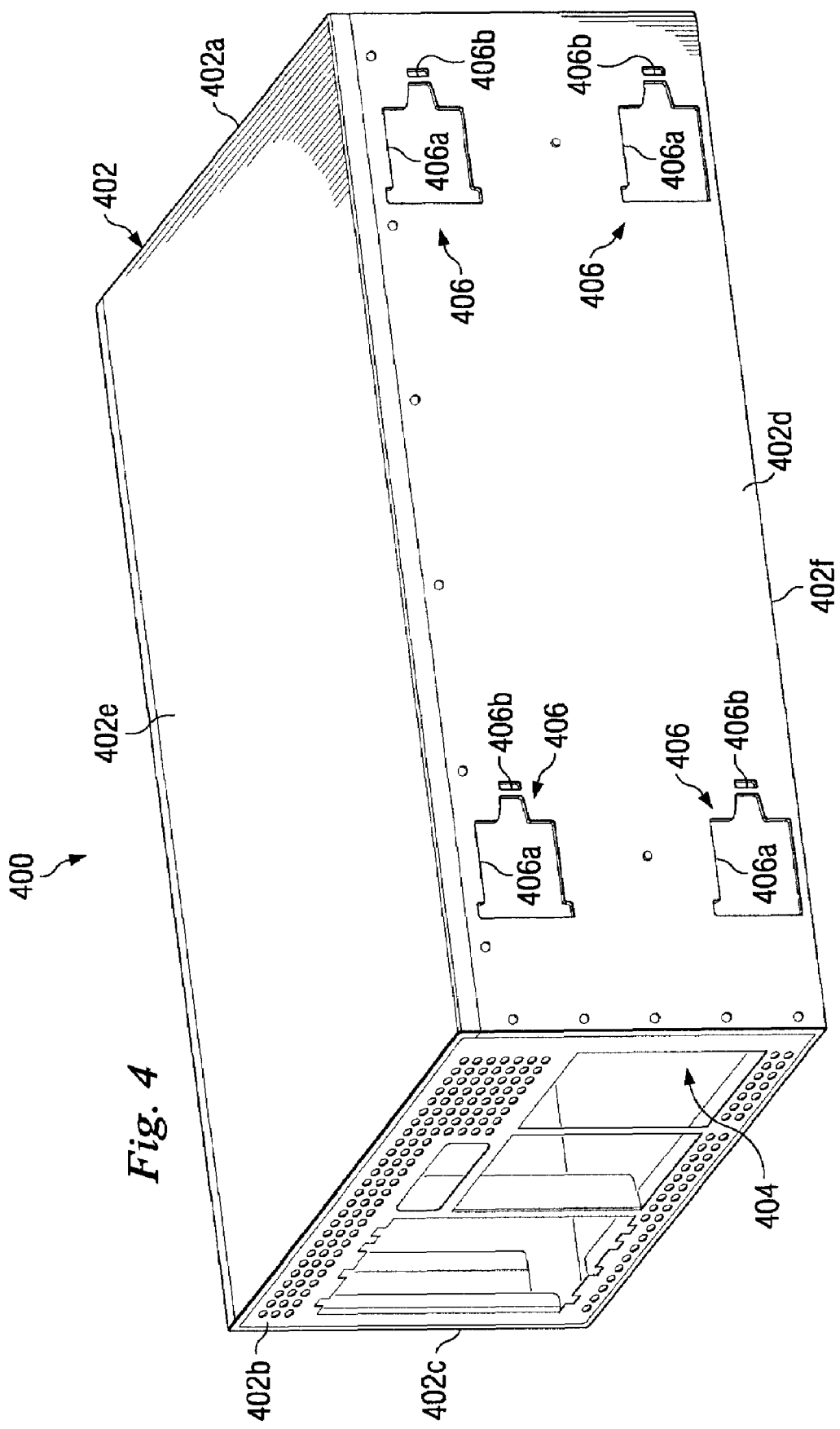

CHASSIS FOOT AND OPTIONAL CASTOR ASSEMBLY

BACKGROUND

The present disclosure relates generally to information handling systems, and more particularly to a foot and optional castor assembly for an information handling system chassis.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Conventional IHSs are generally housed in IHS chassis such as, for example, server towers. It is sometimes desirable to stabilize the IHS chassis in order to reduce the chance that the IHS chassis will fall over. It is sometimes also desirable to increase the mobility of the IHS chassis to make it easier to move. Increasing the stability and mobility of the IHS chassis raises a number of issues.

Typically, the stability of the IHS chassis may be increased by coupling feet to the IHS chassis. Conventional feet can be cumbersome and difficult to install. For example, generally four separate feet are provided, each which must be coupled to the IHS chassis with a screw such that the user must have a tool. In addition, if it is also desired to increase the mobility of the IHS chassis, a castor may be provided that must be coupled to each of the feet. The coupling of the castor to the feet can increase the difficulty of the installation, as typically each foot and castor combination must be held to the IHS chassis at the same time while the screw is inserted through both and coupled to the IHS chassis in order to couple the castor and the foot to the IHS chassis. Furthermore, the addition of the castor to the foot raises the height of the IHS chassis by the height of the castor, which is undesirable.

Accordingly, it would be desirable to provide a chassis foot and optional castor assembly absent the disadvantages found in the prior methods discussed above.

SUMMARY

According to one embodiment, a chassis foot and optional castor apparatus includes a chassis foot member, a chassis coupling member located on the chassis foot member and engageable with a chassis to couple the chassis foot member to the chassis without the use of a tool, and a castor coupling member located on the chassis foot member and engageable with a castor to couple the castor to the chassis foot member without the use of a tool.

BRIEF DESCRIPTION OF THE DRAWINGS

FIG. 2b is a bottom perspective view illustrating an embodiment of the castor of FIG. 2a.

FIG. 3b is a bottom perspective view illustrating an embodiment of the chassis foot member of FIG. 3a.

FIG. 4 is a perspective view illustrating an embodiment of a chassis used with the castor of FIGS. 2a and 2b and the chassis foot member of FIGS. 3a, 3b and 3c.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
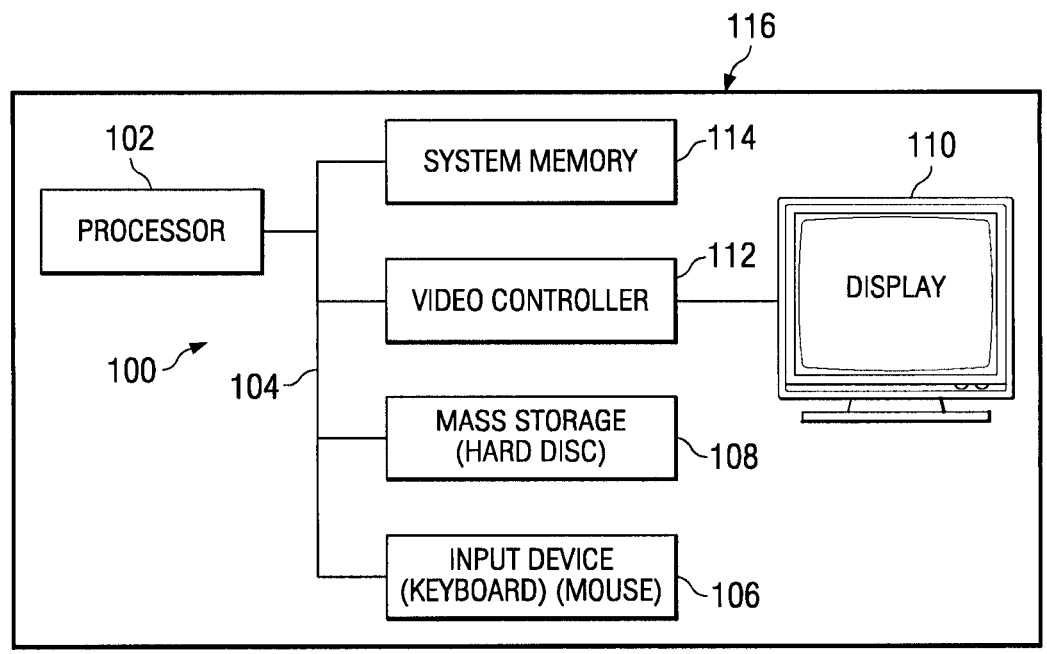
FIG. 1 is a schematic view illustrating an embodiment of an IHS.

In one embodiment, IHS 100, FIG. 1, includes a processor 102, which is connected to a bus 104. Bus 104 serves as a connection between processor 102 and other components of computer system 100. An input device 106 is coupled to processor 102 to provide input to processor 102. Examples of input devices include keyboards, touchscreens, and pointing devices such as mouses, trackballs and trackpads. Programs and data are stored on a mass storage device 108, which is coupled to processor 102. Mass storage devices include such devices as hard disks, optical disks, magneto-optical drives, floppy drives and the like. IHS 100 further includes a display 110, which is coupled to processor 102 by a video controller 112. A system memory 114 is coupled to processor 102 to provide the processor with fast storage to facilitate execution of computer programs by processor 102. In an embodiment, a chassis 116 houses some or all of the components of IHS 100. It should be understood that other buses and intermediate circuits can be deployed between the components described above and processor 102 to facilitate interconnection between the components and the processor 102.

Figure 2A:
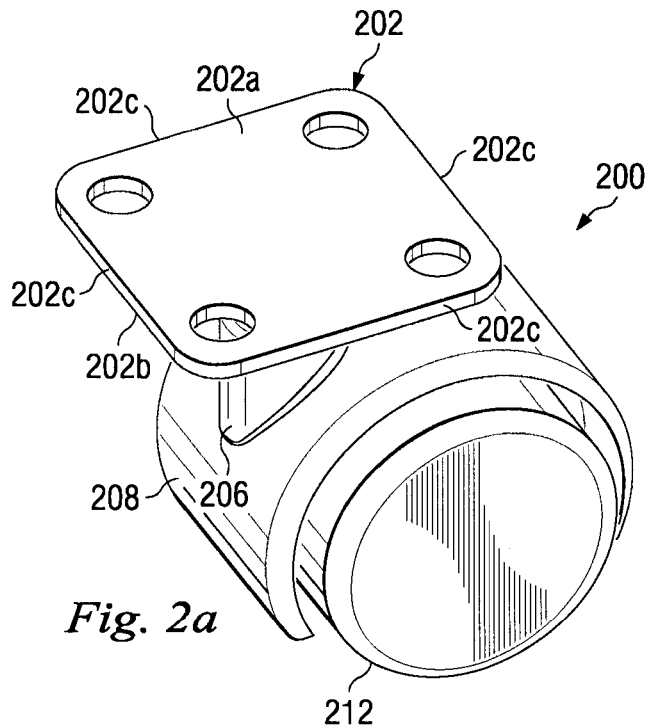
FIG. 2a is a top perspective view illustrating an embodiment of a castor.
Figure 5A:
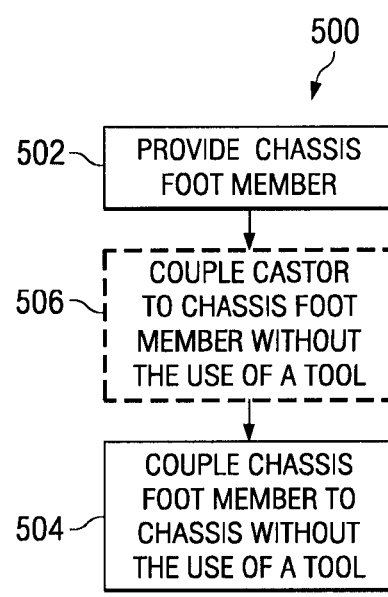
FIG. 5a is a flow chart illustrating an embodiment of a method for coupling a foot and a castor to a chassis.
Figure 2B:
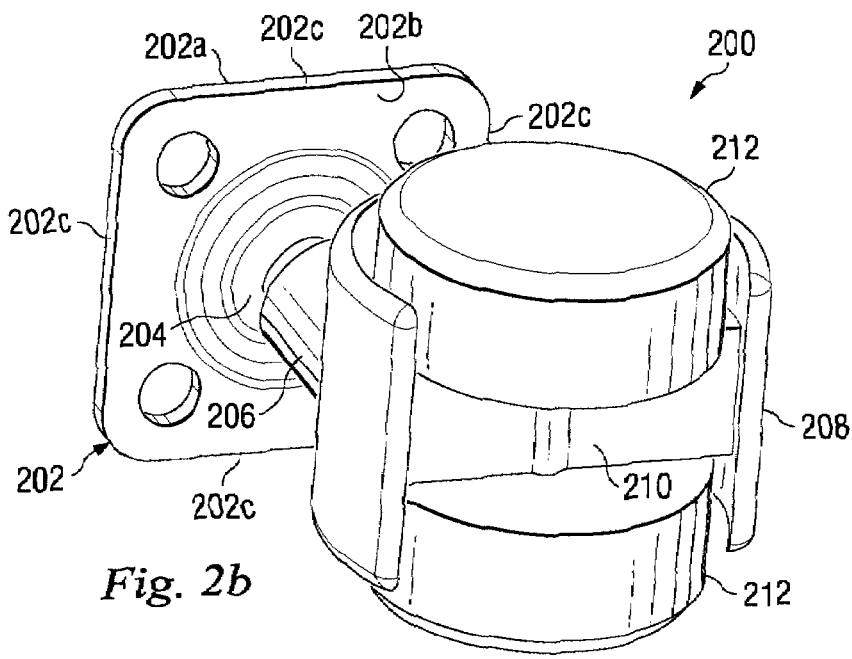

Referring now to FIGS. 2a and 2b, a castor 200 is illustrated. The castor 200 includes a substantially square base 202 having a top surface 202a, a bottom surface 202b located opposite the top surface 202a, and a side edge 202c extending between the top surface 202a and the bottom surface 202b and about the perimeter of the base 202. A rotatable coupling 204 is coupled to and extends from the bottom surface 202b of the base 202 and is located substantially centrally on the base 202 such that the base 202 is symmetrical about the rotational coupling 204. A leg 206 is coupled to the rotational coupling 204 and includes a wheel guard 208 coupled to its distal end. A wheel mount 210 is housed by the wheel guard 208 and a wheel 212 is rotatably coupled to the wheel mount 210. The rotatable coupling 204 on the base 202 allows the wheel 212 and wheel guard 208 to rotate relative the base 202 on the leg 206 while the wheel 212 is also free to rotate relative to the wheel mount 210.

Figure 3A:
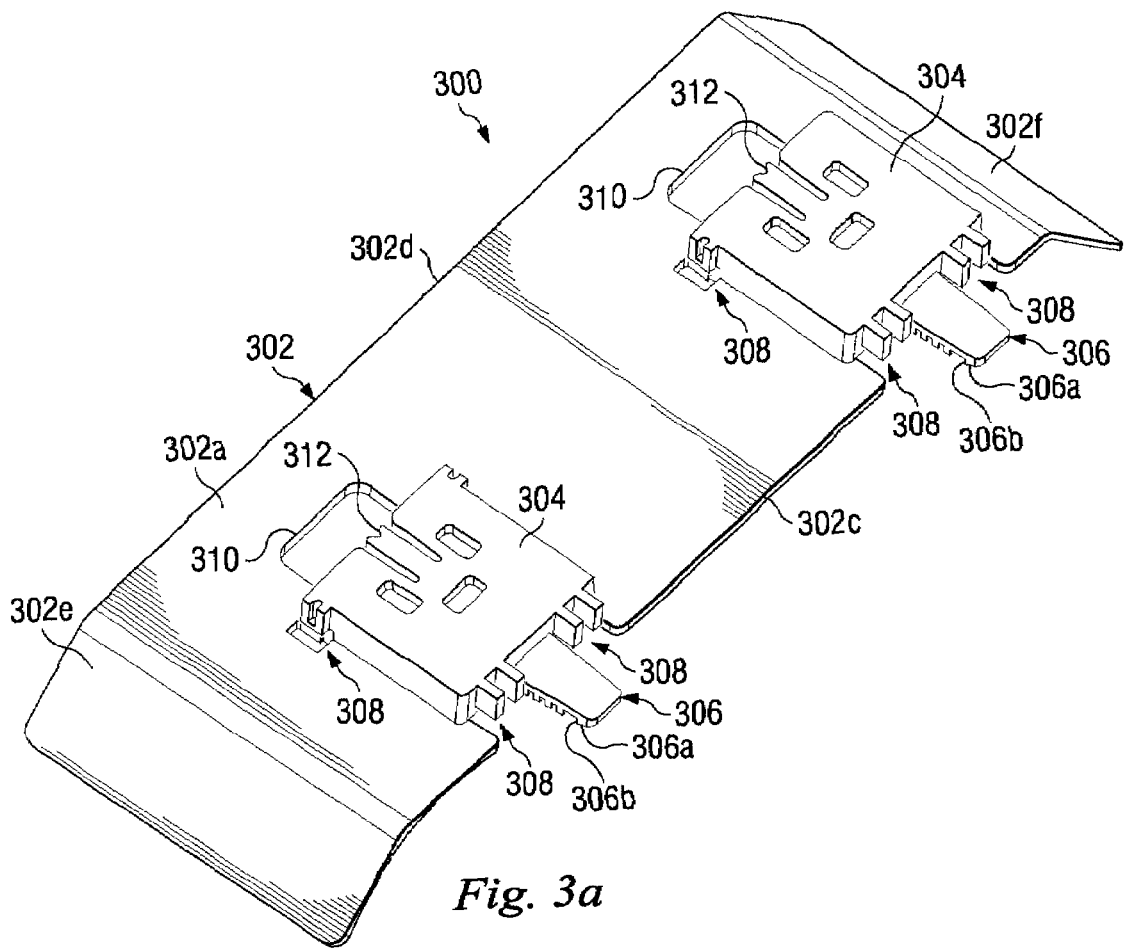
FIG. 3a is a top perspective view illustrating an embodiment of a chassis foot member used with the castor of FIGS. 2a and 2b.
Figure 3B:
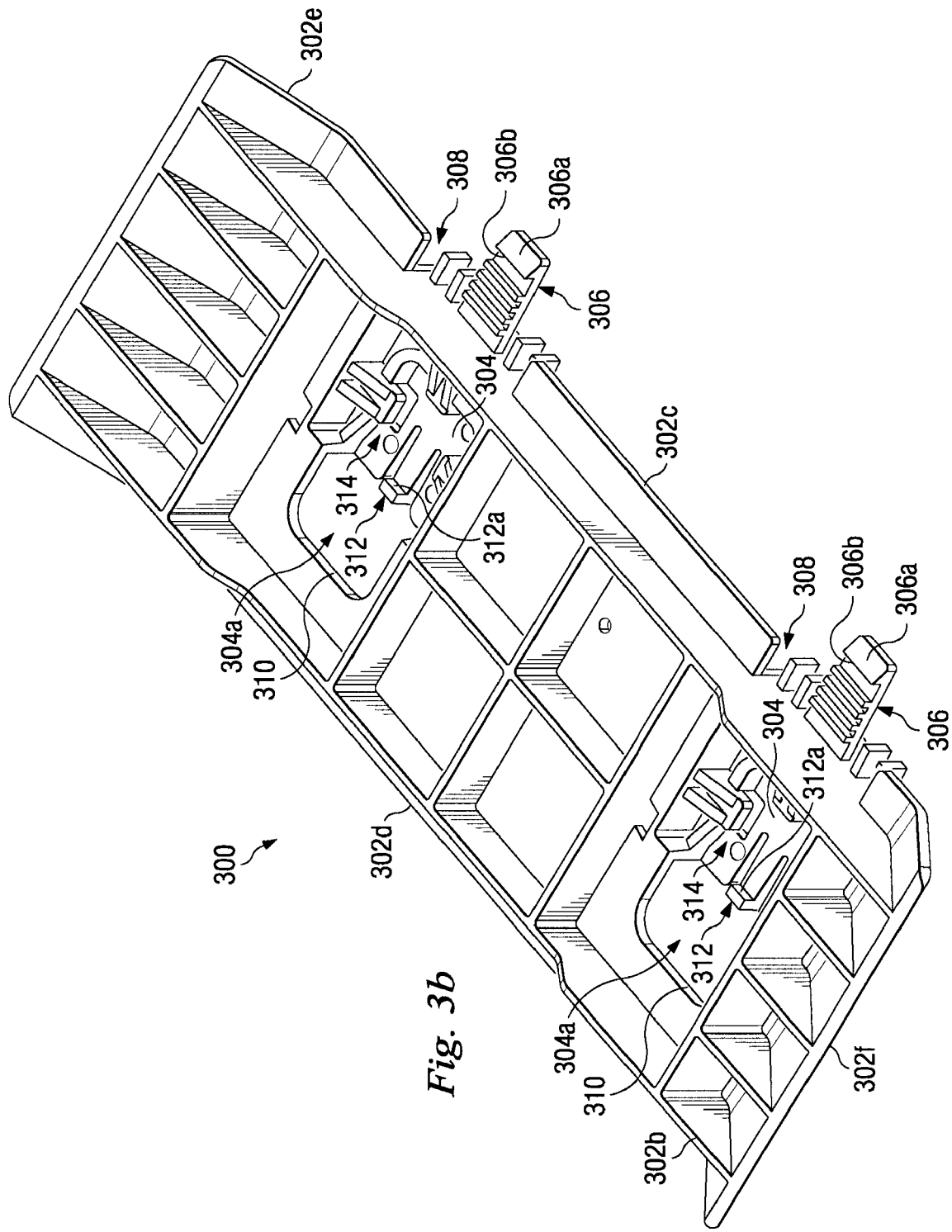
Figure 3C:
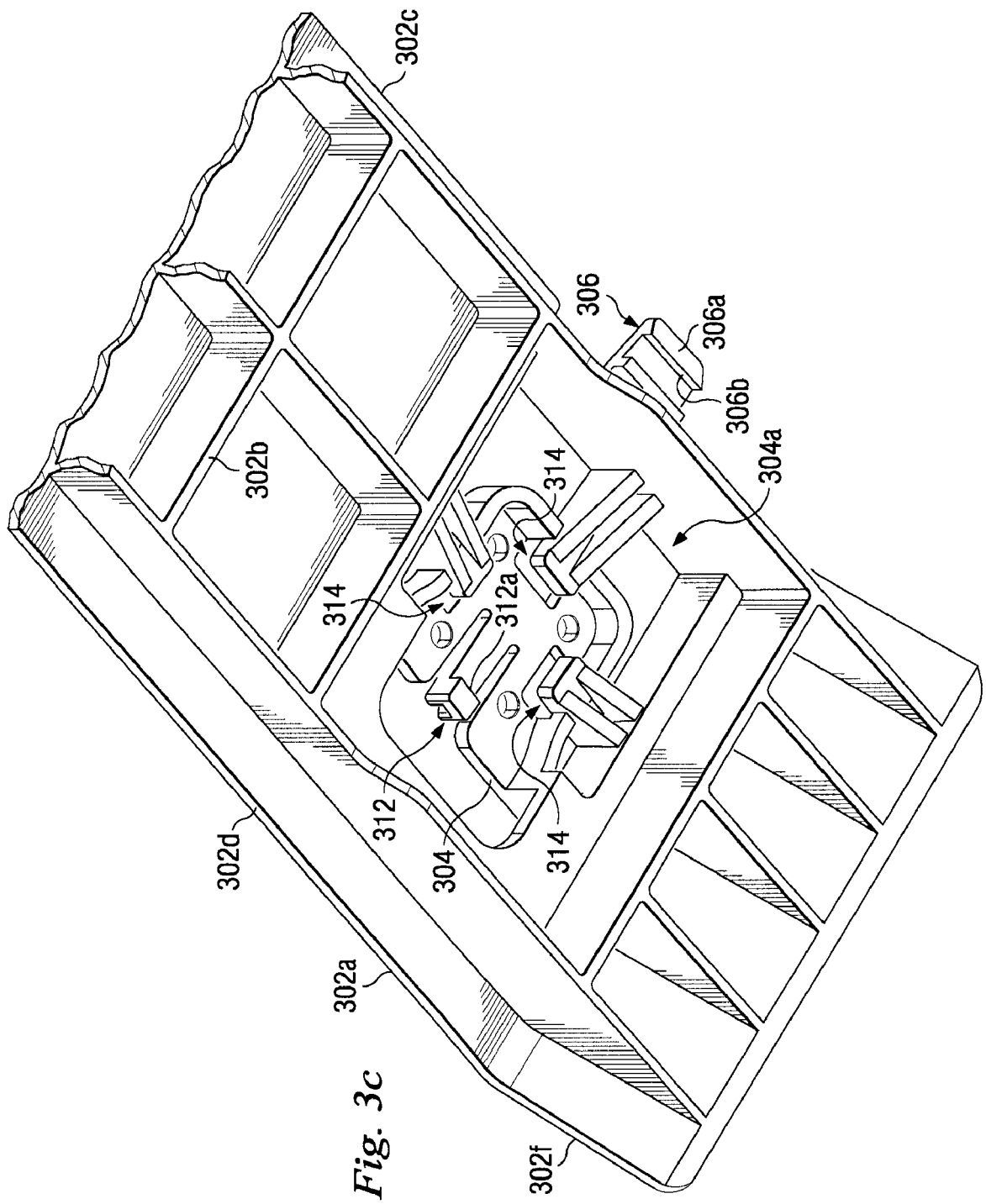
FIG. 3c is a bottom perspective view illustrating an embodiment of a castor housing including a castor coupling member on the chassis foot member of FIGS. 3a and 3b.

Referring now to FIGS. 3a, 3b and 3c, a chassis foot member 300 is illustrated. The chassis foot member 300 includes a base 302 having a top chassis engagement surface 302a, a bottom floor engagement surface 302b located opposite the top chassis engagement surface 302a, a front edge 302c extending from the top chassis engagement surface 302a, a rear edge 302d located opposite the front edge 302c and extending from the top chassis engagement surface 302a, and a pair of opposing side surface 302e and 302f extending between the top chassis engagement surface 302a, the bottom floor engagement surface 302b, the front edge 302c, and the rear edge 302d. A pair of castor housing members 304 extend from the top chassis engagement surface 302a in a spaced apart orientation along the length of the base 302 such that a castor housing member 304 is located adjacent the side surface 302e and a castor housing member is located adjacent the side surface 302f. Each of the castor housing members 304 and the base 302 of the chassis foot member 300 define a castor housing 304a located between the castor housing member 304 and the bottom floor engagement surface 302b. In an embodiment, a chassis coupling member includes a resilient chassis securing beam 306 that extends from the castor housing member 304 and out past the front edge 302c of the base 302. Each resilient chassis securing beam 306 includes a beveled surface 306a located adjacent its distal end and a securing surface 306b located adjacent the beveled surface 306a. In an embodiment the chassis coupling member also includes a plurality of chassis channels 308 that are defined by the castor housing member 304 and located about the perimeter of the castor housing member 304. A castor passageway 310 is defined by the base 302, located between the rear edge 302d of the base 302 and each castor housing member 304, and extends through the base 302 from the top chassis engagement surface 302a to the castor housing 304a. In an embodiment, a castor coupling member includes a resilient castor securing beam 312 that extends from the castor housing member 304, includes a securing surface 312a adjacent its distal end, and is located adjacent the castor housing 304a. In an embodiment, the castor coupling member includes a plurality of castor channels 314 defined by the castor housing member 304 and located adjacent the resilient castor securing beam 312 and the castor housing 304a. In an embodiment, the chassis floor member 300 may be fabricated from a plastic material allowing the chassis engagement surface 302a to easily include industrial design language.

Referring now to FIG. 4, a chassis 400 is illustrated. In an embodiment, the chassis 400 may be, for example, the chassis 116, described above with reference to FIG. 1, and may house some or all of the components of the IHS 100, described above with reference to FIG. 1. In an embodiment, the chassis 400 may be, for example, a server tower. The chassis 400 includes a base 402 having a front wall 402a, a rear wall 402b located opposite the front wall 402a, a top wall 402c extending between the front wall 402a and the rear wall 402b, a bottom wall 402d located opposite the top wall 402c and extending between the front wall 402a and the rear wall 402b, and a pair of opposing side walls 402e and 402f extending between the front wall 402a, the rear wall 402b, the top wall 402c, and the bottom wall 402d. The base 402 defines an IHS housing 404 located between the front wall 402a, the rear wall 402b, the top wall 402c, the bottom wall 402d, and the side walls 402e and 402f. A plurality of chassis foot coupling features 406 are located on the bottom wall of the base 402 and, in an embodiment, include a castor housing member aperture 406a that is defined by the bottom wall 402d, extends through the bottom wall 402d to the IHS housing 404, and is of a substantially similar shape as the castor housing member 304 and resilient chassis securing beam 306, described above with reference to FIGS. 3a, 3b and 3c. The chassis foot coupling feature 406 may also include a securing aperture 406b that is defined by the bottom wall 402d, extends through the bottom wall 402d to the IHS housing 404, and is located adjacent the castor housing member aperture 406a.

Figure 5B:
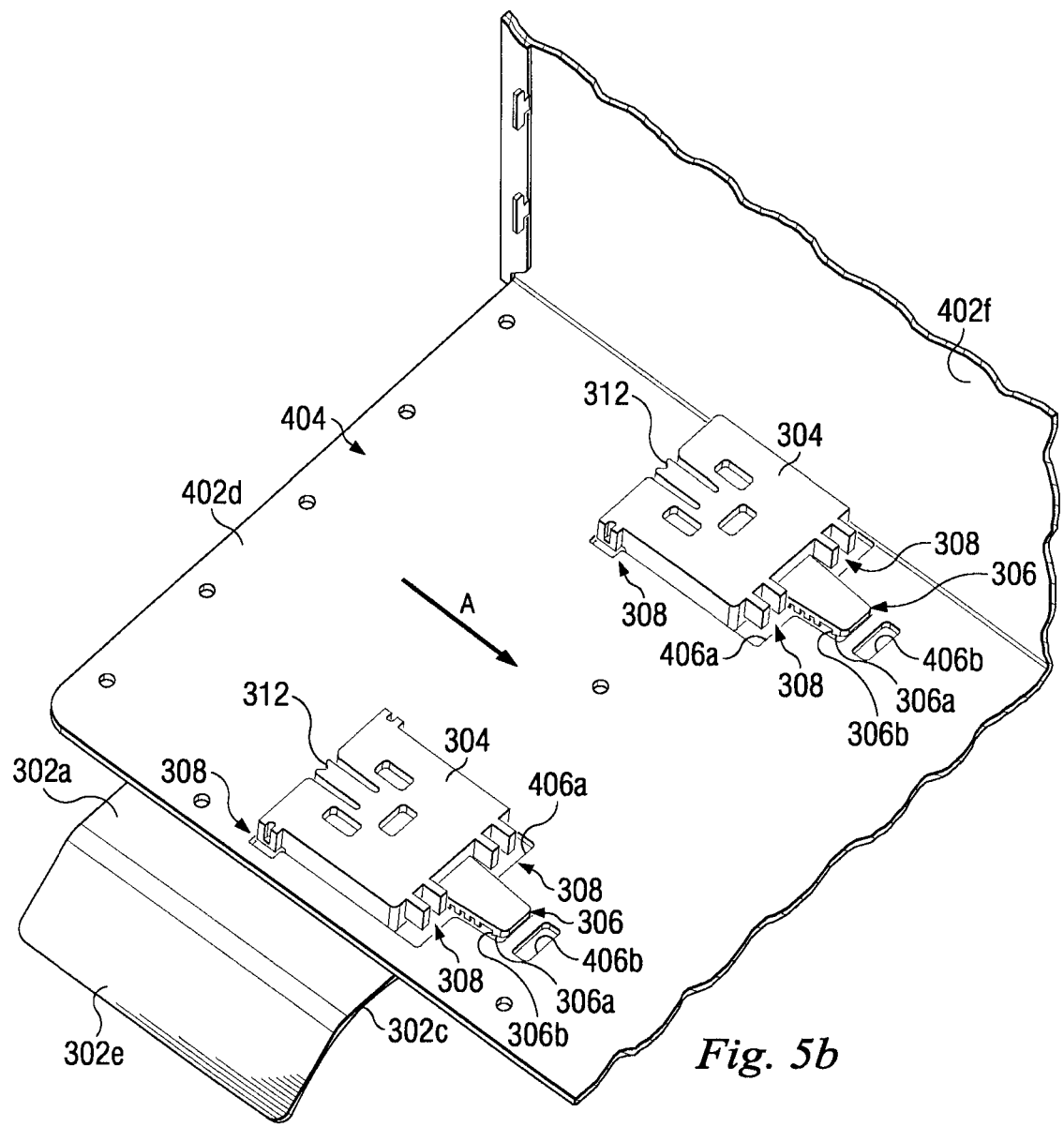
FIG. 5b is a perspective view illustrating an embodiment of the chassis foot member of FIGS. 3a, 3ab and 3c being coupled to the chassis of FIG. 4.
Figure 5C:
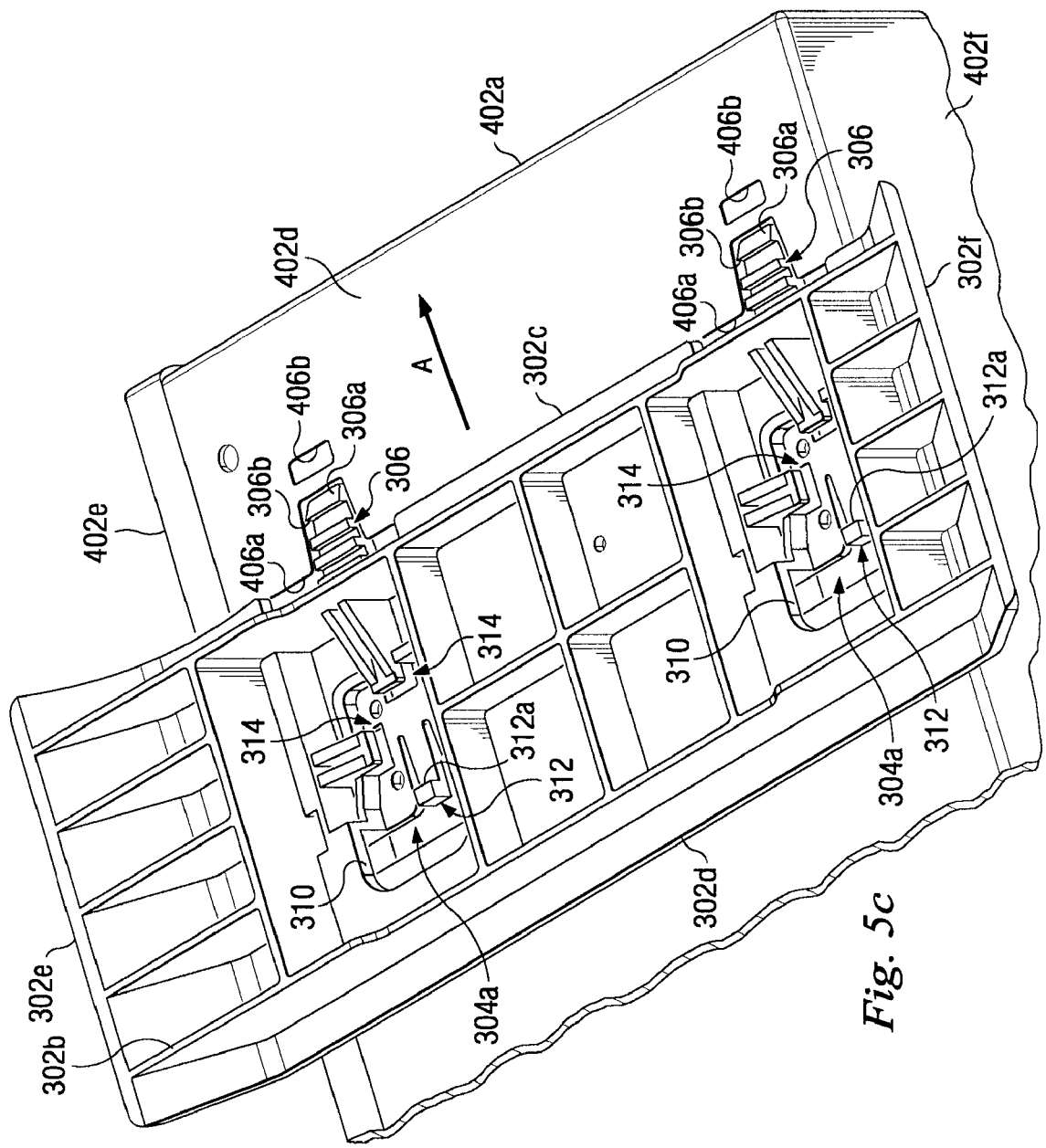
FIG. 5c is a perspective view illustrating an embodiment of the chassis foot member of FIGS. 3a, 3ab and 3c being coupled to the chassis of FIG. 4.
Figure 5D:
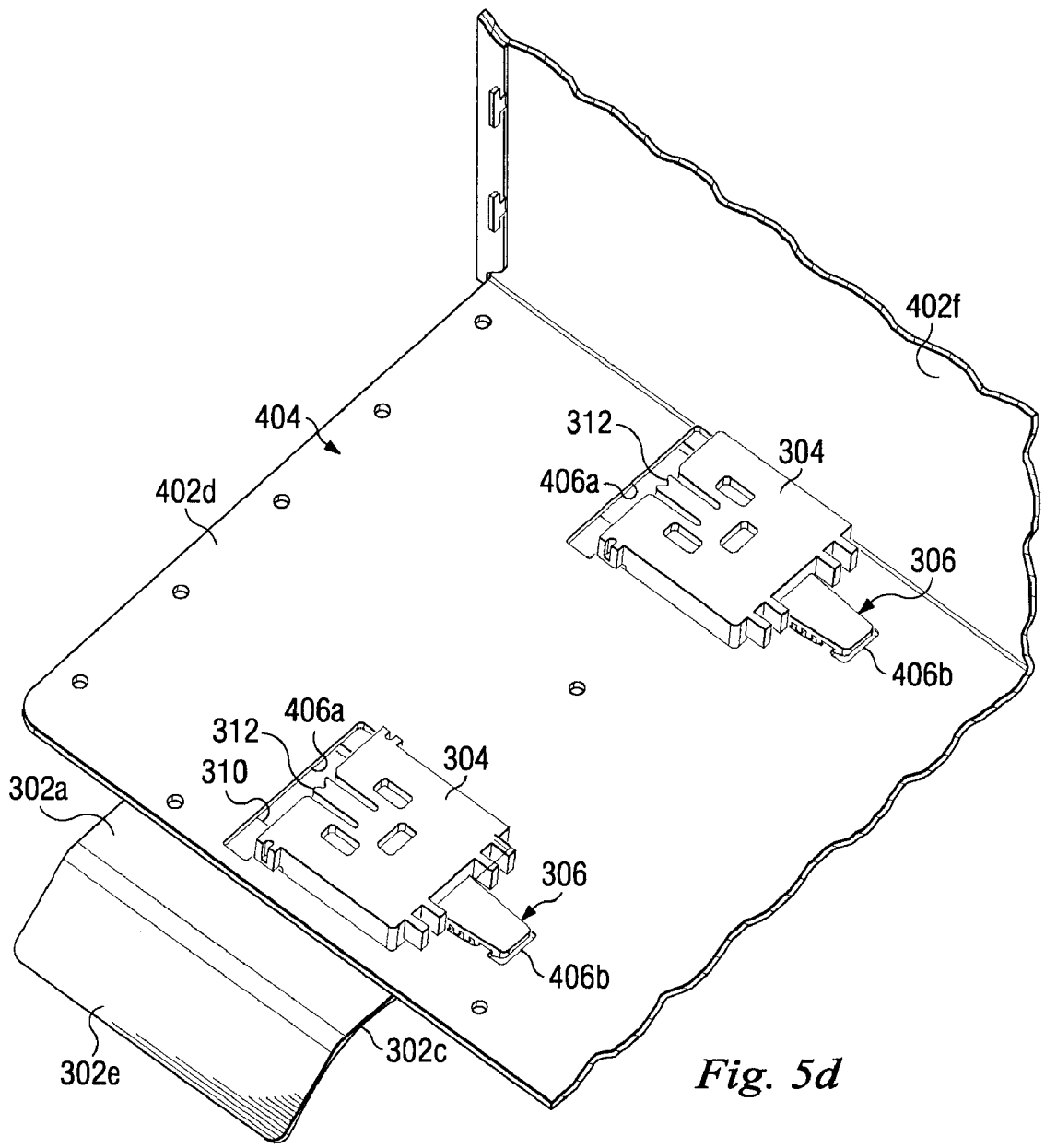
FIG. 5d is a perspective view illustrating an embodiment of the chassis foot member of FIGS. 3a, 3ab and 3c coupled to the chassis of FIG. 4.
Figure 5E:
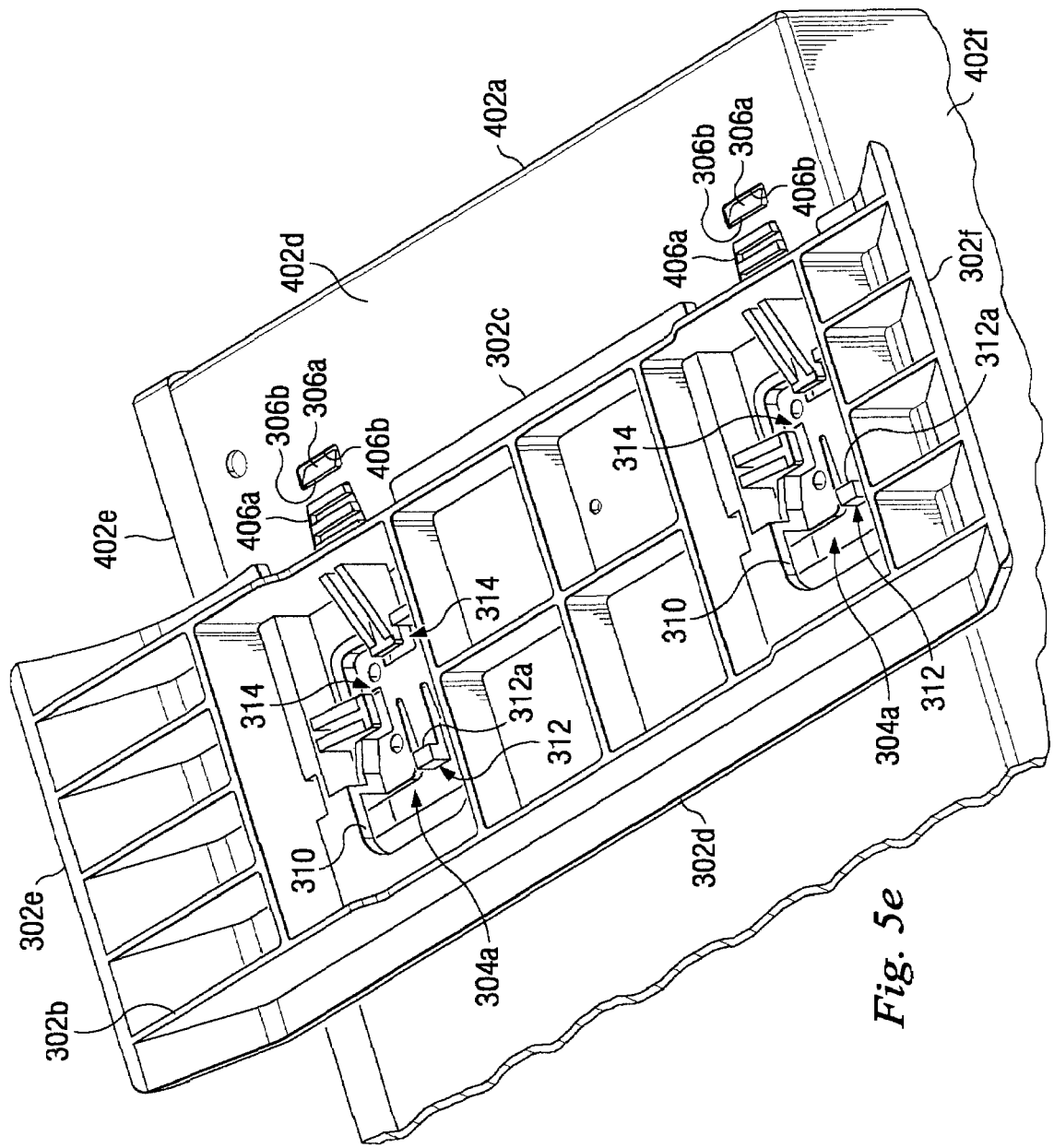
FIG. 5e is a perspective view illustrating an embodiment of the chassis foot member of FIGS. 3a, 3ab and 3c coupled to the chassis of FIG. 4.
Figure 5F:
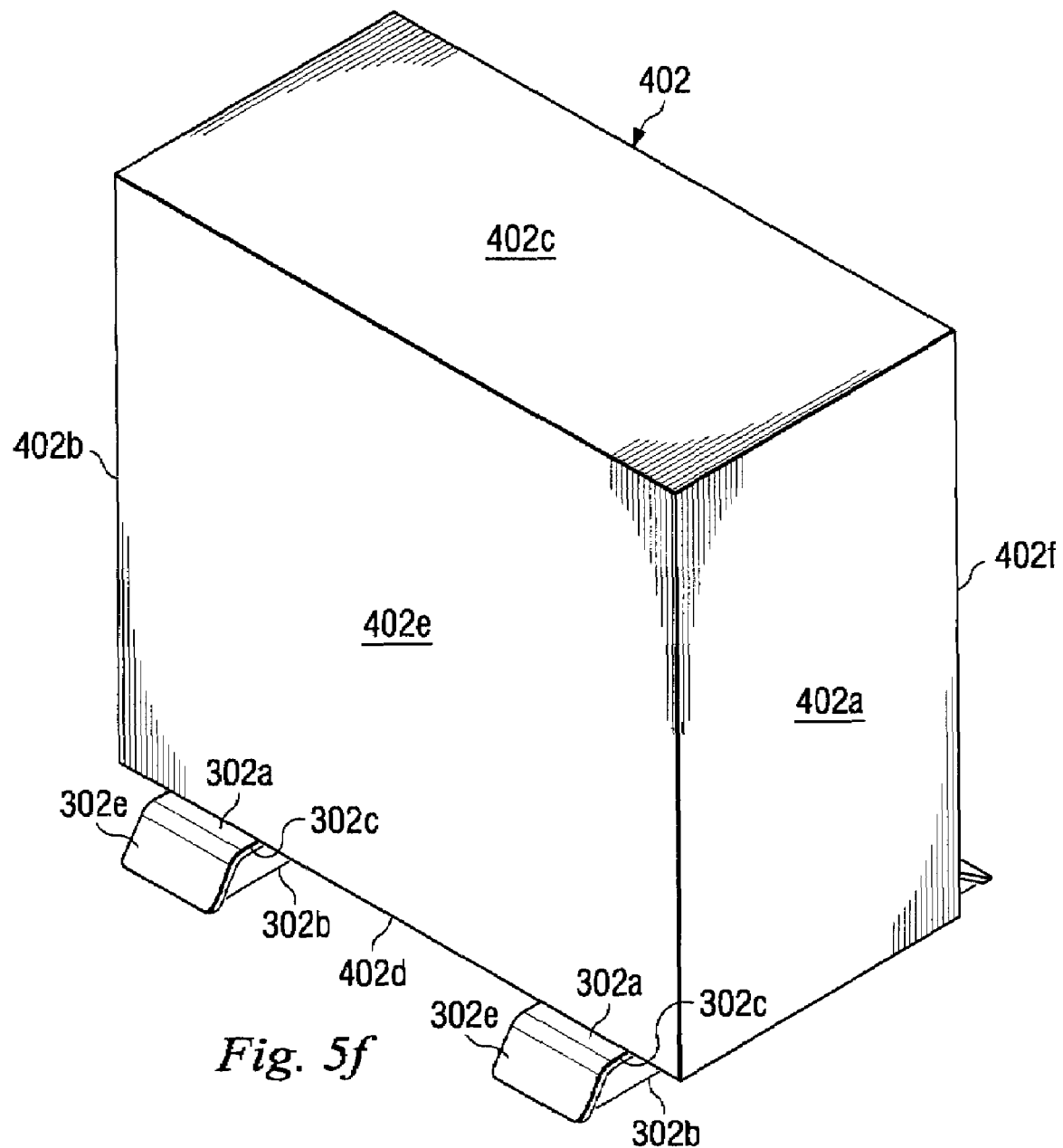
FIG. 5f is a perspective view illustrating an embodiment of the chassis of FIG. 4 being supported by a plurality of the chassis foot members of FIGS. 3a, 3ab and 3c.

Referring now to FIGS. 3a, 3b, 3c, 4, 5a, 5b, 5c, 5d, 5e and 5f, a method 500 for coupling a foot and a castor to a chassis is illustrated. The method 500 begins at step 502 where the chassis foot member 300, described above with reference to FIGS. 3a, 3b and 3c, is provided. If only the stability of the chassis 400 is desired to be increased, the method 500 then proceeds to step 504 where the chassis foot member 300 is coupled to the chassis 400 without the use of a tool. The chassis foot member 300 is positioned adjacent the chassis 400 such that the top chassis engagement surface 302a is located adjacent the bottom wall 402d of the chassis 400 and the castor housing members 304 are aligned with the castor housing member apertures 406a. The chassis foot member 300 is then moved towards the chassis 400 such that top chassis engagement surface 302a on the chassis foot member 300 engages the bottom wall 402d on the chassis and the castor housing members 304 extend through the castor housing member apertures 406a and into the IHS housing 404, as illustrated in the FIGS. 5b and 5c. In an embodiment, the castor housing member apertures 406a are keyed with respect to the castor housing members 304 such that the chassis foot member 300 cannot be coupled to the chassis 400 in the wrong orientation. With the castor housing members 304 extending through the castor housing member apertures 406a, the resilient chassis securing beam 306 extending from each castor housing member 304 is located adjacent the securing aperture 406b. The chassis foot member 300 is then moved in a direction A such that the beveled surface 306a on each resilient chassis securing beam 306 engages the bottom wall 402d adjacent the securing apertures 406b and deflects the resilient chassis securing beam away from the bottom wall and towards the IHS housing 404. Further movement of the chassis foot member 300 in the direction A results in the bottom wall 402d of the chassis 400 entering the plurality of chassis channels 308 and resilient chassis securing beam 306 resiliently deflecting back towards the bottom wall 402d of the chassis 400 to allow the securing surface 306b on the resilient chassis securing beam 306 to engage the bottom wall 402d adjacent the securing aperture 406b, securing the chassis foot member 300 to the chassis 400 in all 6 degrees of freedom, as illustrated in FIGS. 5d and 5e. In an embodiment, two chassis foot members 300 may be coupled to the chassis 400 in the manner described above and the chassis 400 may be supported on the chassis foot members 300, as illustrated in FIG. 5f. To remove the chassis foot members 300 from the chassis 400, the resilient chassis securing beams 306 are deflected away from the bottom wall 402d of the chassis 400 such that the securing surface 306b of the resilient chassis securing beam 306 disengages the bottom wall 402d adjacent the securing aperture 406b and the chassis foot member 300 moved in a direction opposite the direction A until the castor housing members 304 may be removed from the IHS housing 404 through the castor housing member apertures 406a.

Figure 5G:
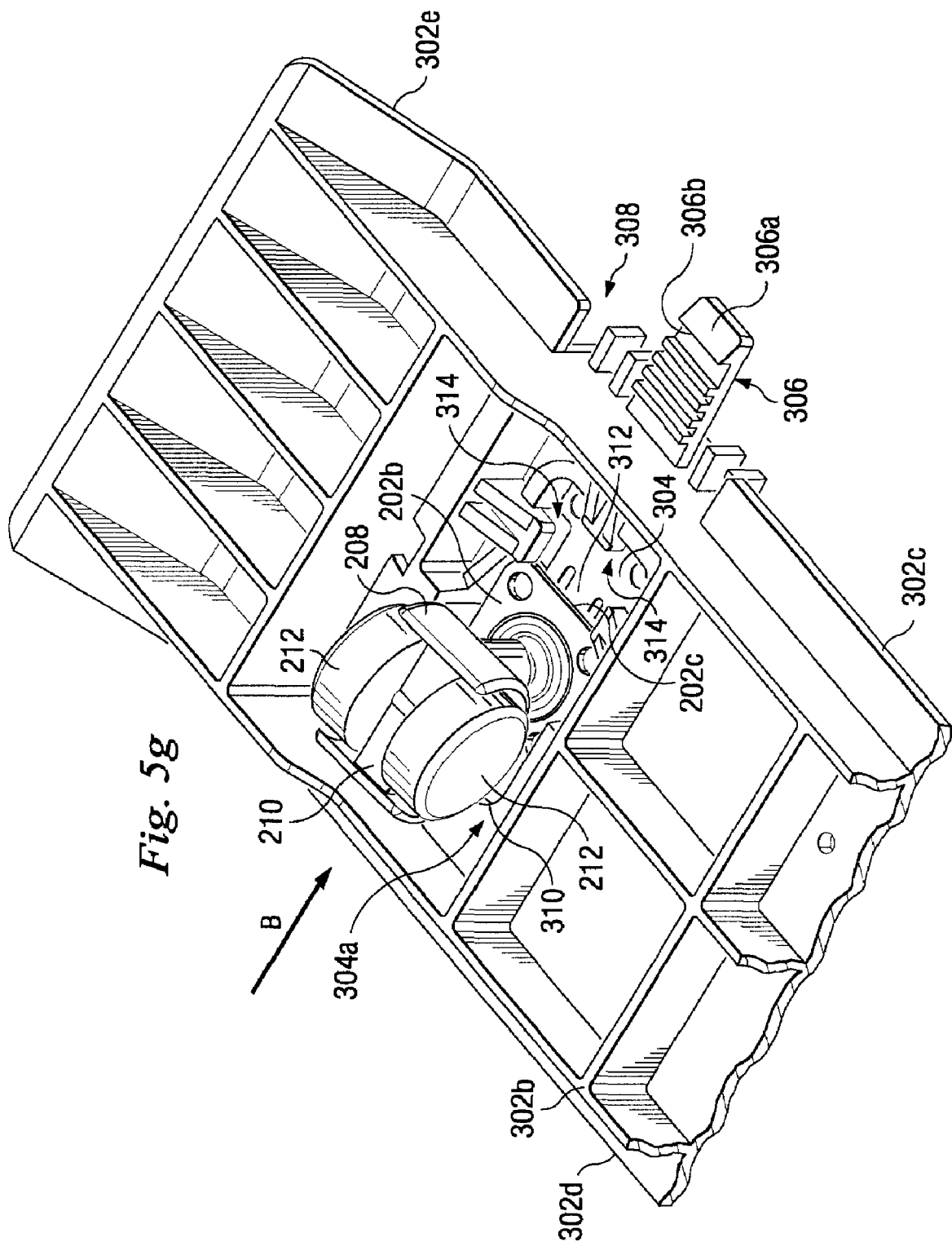
FIG. 5g is a perspective view illustrating an embodiment of the castor of FIGS. 2a and 2b being coupled to the chassis foot member of FIGS. 3a, 3ab and 3c.
Figure 5H:
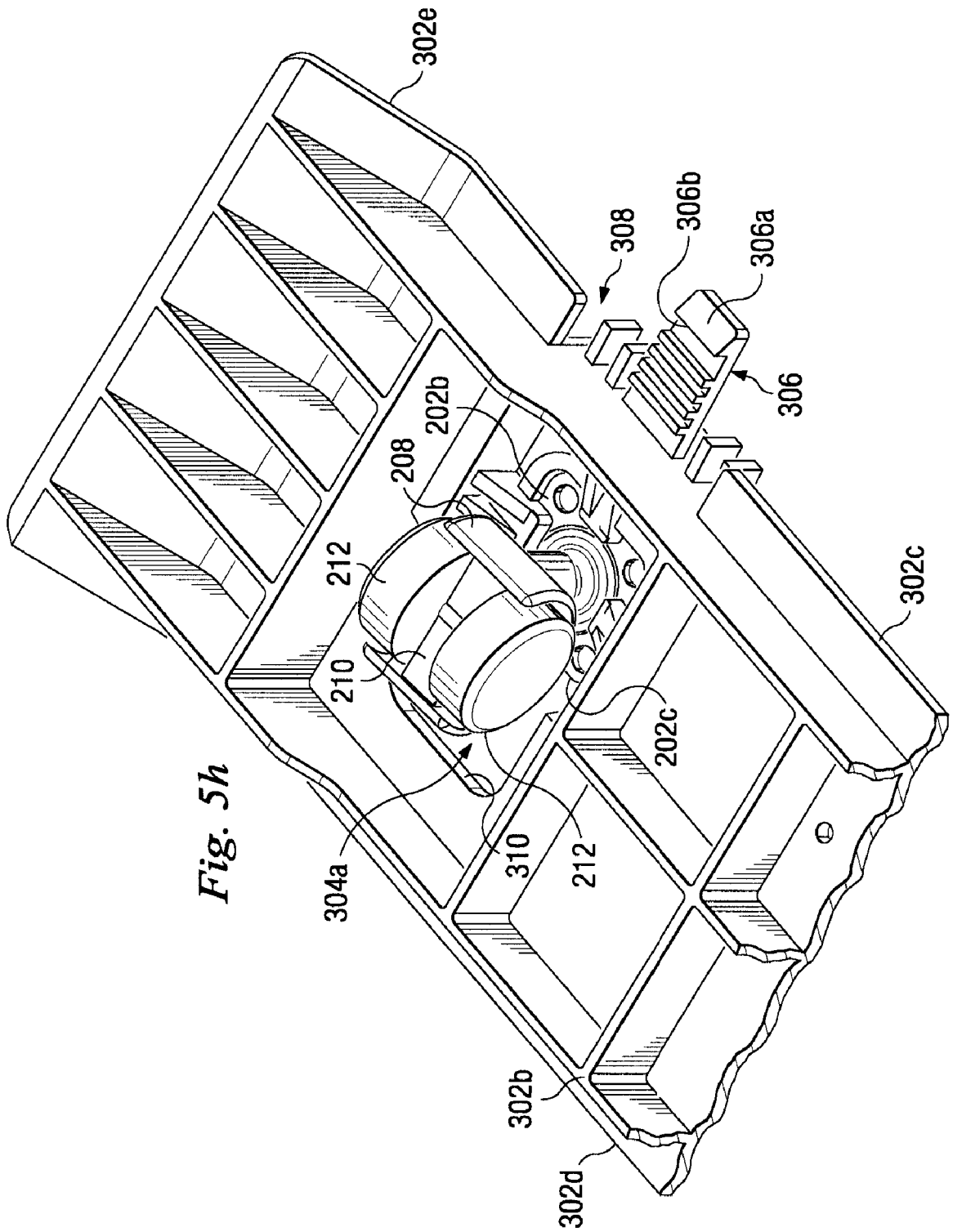
FIG. 5h is a perspective view illustrating an embodiment of the castor of FIGS. 2a and 2b coupled to the chassis foot member of FIGS. 3a, 3ab and 3c.
Figure 5I:
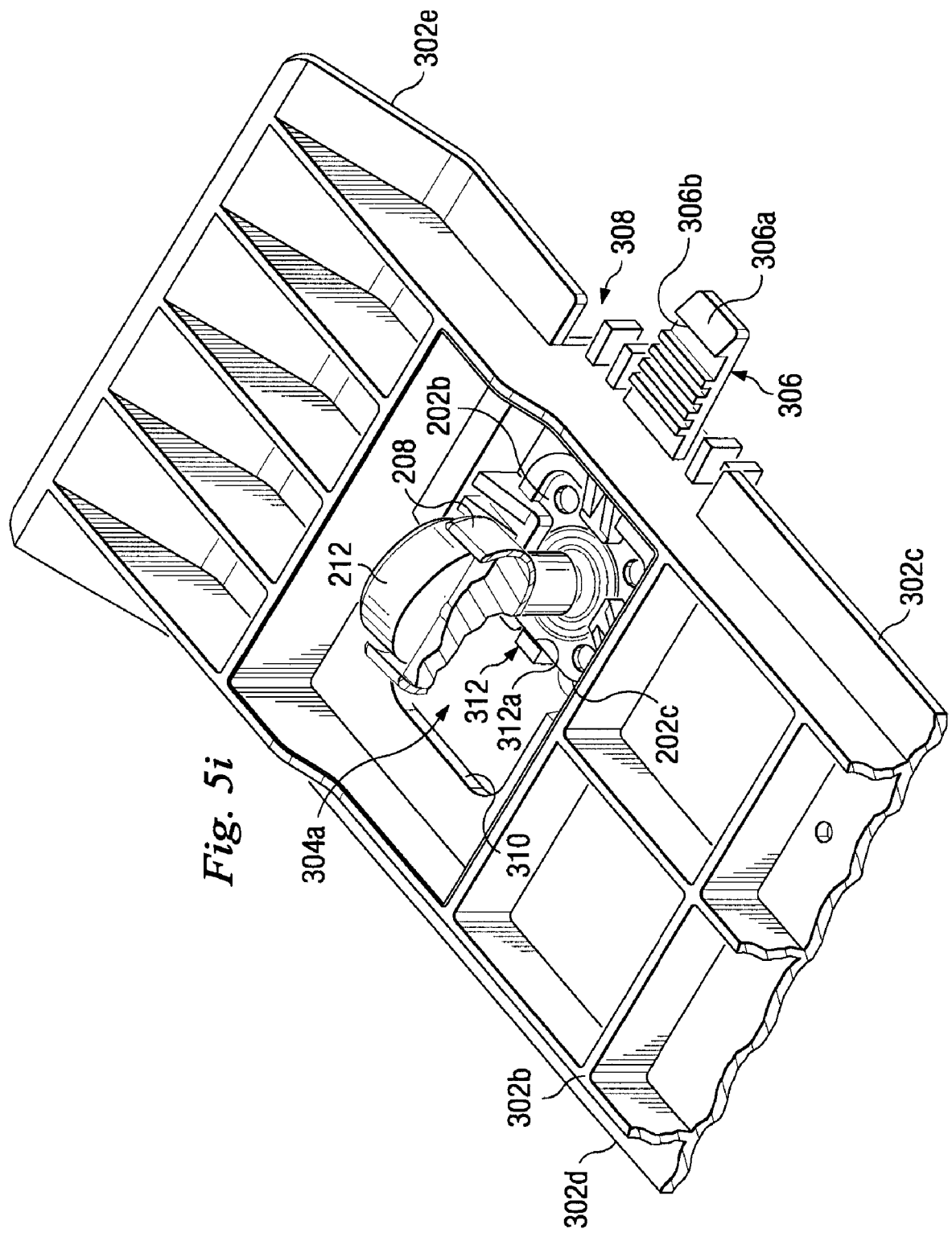
FIG. 5i is a cut away perspective view illustrating an embodiment of the castor of FIGS. 2a and 2b coupled to the chassis foot member of FIGS. 3a, 3ab and 3c.
Figure 5J:
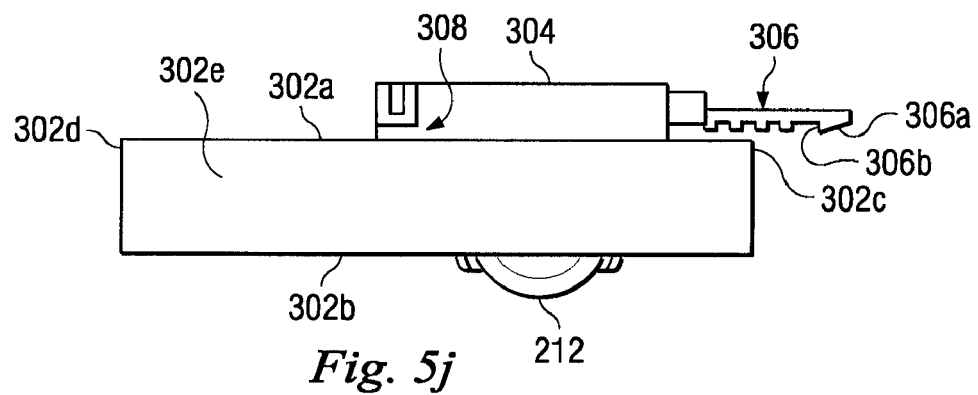
FIG. 5j is a side view illustrating an embodiment of the castor of FIGS. 2a and 2b coupled to the chassis foot member of FIGS. 3a, 3ab and 3c.
Figure 5K:
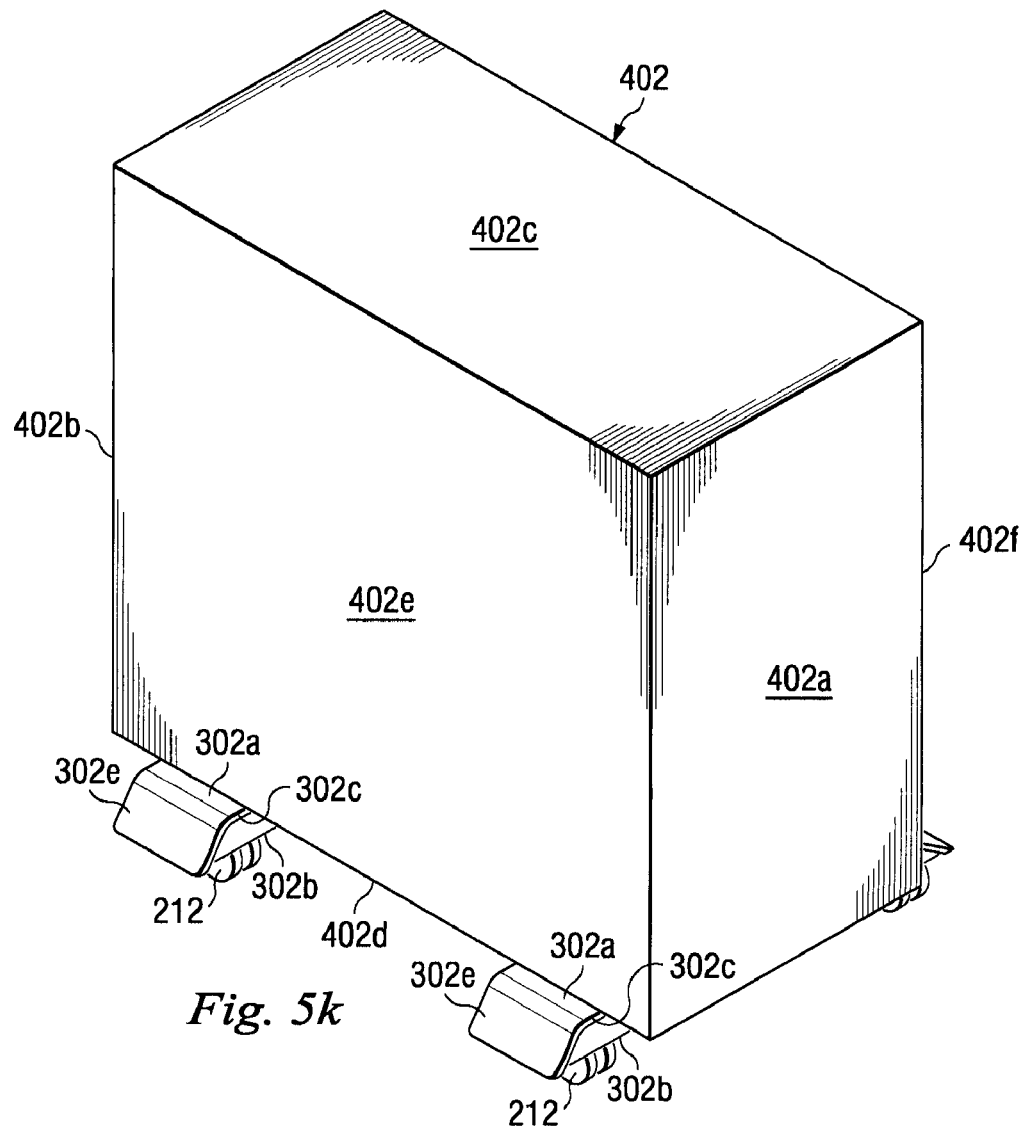
FIG. 5k is a perspective view illustrating an embodiment of the chassis of FIG. 4 being supported by a plurality of the chassis foot members of FIGS. 3a, 3ab and 3c and a plurality of the castors of FIGS. 2a and 2b.

Referring now to FIGS. 2a, 2b, 3a, 3b, 3c, 5a, 5g, 5h, 5i, 5j and 5k, if the mobility of the chassis 400 is desired to be increased, the method 500 includes step 506 between steps 502 and 504, where the castor 200 is coupled to the chassis foot member 300 without the use of a tool before the chassis foot member 300 is coupled to the chassis 400 without the use of a tool. The castor 200 is positioned in the castor housing 304a by moving the castor through the castor passageway 310 until the top surface 202a of the base 202 engages the distal end of the resilient castor securing beam 312 and resiliently deflects the resilient castor securing beam 312 away from the castor housing 304a while the side edge 202c of the base 202 is aligned with the plurality of castor channels 314, as illustrated in FIG. 5g. The castor 200 is then moved in a direction B such that the base 202 enters the plurality of castor channels 314 and the resilient castor securing beam 312 is allowed to resiliently deflect back towards the castor housing 304a such that the securing surface 312a on the resilient castor securing member 312 engages the side edge 202c of the base 202, securing the castor 200 to the chassis foot member 300 in all 6 degrees of freedom, as illustrated in FIGS. 5h and 5i. With the castor 200 coupled to the chassis foot member 300, the castor 200 is located substantially in the castor housing 304a such that only a portion of the wheel 212 extends out below the bottom floor engagement surface 302b on the chassis foot member 300, as illustrated in FIG. 5j. In an embodiment, two castors 200 may be coupled to each chassis foot member 300 in the manner described above, two chassis foot members 300 may be coupled to the chassis 400 in the manner described above according to step 504 of the method 500, and the chassis 400 may be supported and mobilized on the chassis foot members 300 and castors 200, as illustrated in FIG. 5k. In an embodiment, an inner chassis wall may be located in the IHS housing such that when the chassis foot member 300 and the castor 200 are coupled to the chassis 400, the inner chassis wall engages the resilient castor securing beam 312 and prevents the resilient castor securing beam 312 from deflecting and releasing the castor 200 from the castor coupling member. In an embodiment, the amount of the portion of the wheels 212 that extend out of the castor housing 304a and below the bottom floor engagement surface 302b of the chassis foot member 300 may be chosen to minimize the additional height of the chassis with the chassis foot member 300 and castor 200 coupled to it while still allowing the wheel 212 to achieve the function of allowing increased mobility of the chassis 400. To remove the castors 200 from the chassis foot members 300, the resilient castor securing beams 312 are deflected away from the castor housing 304a such that the securing surface 312a of the resilient castor securing beam 312 disengages the side edge 202c and the castor moved in a direction opposite the direction B until the castor 200 may be removed from the castor housing 304 through the castor passageway 310. Thus, a chassis foot and optional castor assembly is provided which allows a foot and a castor to be coupled to a chassis without the use of a tool while not substantially increasing the height of the chassis relative to the when the foot is coupled to the chassis.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A chassis foot and castor apparatus, comprising:
   a chassis foot member comprising a floor engagement surface and a plurality of castor housing members adjacent a chassis engagement surface that is located opposite the floor engagement surface on the chassis foot member, wherein a castor housing is defined between each castor housing member and the floor engagement surface;
   a chassis coupling member located on the chassis foot member and including a resilient chassis securing beam operable to snap into engagement with a chassis in response to a sliding movement, the chassis coupling member engageable with a chassis to secure the chassis foot member to the chassis without the use of a tool; and
   a castor coupling member located on each castor housing member and including a resilient castor securing beam operable to snap into engagement with a castor base member in response to a sliding movement, each castor coupling member engageable with a respective castor to secure a plurality of castors to the chassis foot member without the use of a tool, wherein each castor comprises a wheel, and only a portion of the wheel extends past the floor engagement surface when the castors are secured to the chassis foot member and located in the castor housings.

2. The apparatus of claim 1, wherein the resilient chassis securing beam extends from the chassis foot member, and wherein the chassis coupling member is insertable through a chassis foot coupling feature defined by the chassis and, in response, the resilient chassis securing beam engages a securing aperture defined by the chassis to secure the chassis foot member to the chassis without the use of a tool.

3. The apparatus of claim 2, wherein the chassis coupling member defines a plurality of chassis channels that house a portion of a chassis when the chassis coupling member is inserted through chassis foot coupling feature and the resilient chassis securing beam is engaged with the securing aperture.

4. The apparatus of claim 1, wherein the resilient castor securing beam extends from the chassis foot member, wherein the resilient castor securing beams are engageable with a side surface of the respective castor in response to the insertion of the castor into the castor coupling member in order to secure the castor to the chassis foot member without the use of a tool.

5. The apparatus of claim 4, wherein each castor coupling member defines a plurality of castor channels that house a portion of the respective castor when the castor is inserted in the castor coupling member and the castor securing beam is engaged with the side surface of the castor.

6. The apparatus of claim 1, wherein each of the castor housing members extend from the chassis engagement surface on the chassis foot member and away from the floor engagement surface.

7. The apparatus of claim 1, wherein the chassis coupling member extends from the castor housing member.

8. The apparatus of claim 1, further comprising:
a plurality of castors secured to the chassis foot member through the engagement of the plurality of castors with respective castor coupling members.

9. The apparatus of claim 8, wherein less than half of the wheel on each castor extends past the floor engagement surface when the casters are secured to the chassis foot member and located in the castor housings.

10. An information handling system (IHS), comprising:
an IHS chassis comprising a chassis foot coupling feature and defining an IHS housing;
a processor coupled to the IHS chassis and located in the IHS housing; and
a chassis foot apparatus coupled to the IHS chassis, the chassis foot apparatus comprising:
a chassis foot member comprising a floor engagement surface and a plurality of castor housing members adjacent a chassis engagement surface that is located opposite the floor engagement surface on the chassis foot member,
wherein a castor housing is defined between each castor housing member and the floor engagement surface;
a chassis coupling member located on the chassis foot member and including a resilient chassis securing beams operable to snap into engagement with a chassis in response to a sliding movement, the chassis coupling member engaged with the chassis foot coupling feature without the use of a tool to secure the chassis foot member to the IHS chassis; and
a castor coupling member located on each castor housing member and including a resilient castor securing beam operable to snap into engagement with a castor base member in response to a sliding movement, each castor coupling member engageable with a respective castor to secure a plurality of castors to the chassis foot member without the use of a tool, wherein each castor comprises a wheel, and only a portion of the wheel extends past the floor engagement surface when the castors are secured to the chassis foot member and located in the castor housings.

11. The system of claim 10, wherein the resilient chassis securing beam extends from the chassis foot member, and wherein the chassis coupling member is located in the chassis foot coupling feature and the resilient chassis securing beam engages a securing aperture defined by the chassis to secure the chassis foot member to the IHS chassis without the use of a tool.

12. The system of claim 11, wherein the chassis coupling member defines a plurality of chassis channels that house a portion of a chassis wall on the IHS chassis with the chassis coupling member located in the chassis foot coupling feature and the resilient chassis securing beam is engaged with the securing aperture.

13. The system of claim 10, wherein the resilient castor securing beam extends from the chassis foot member, wherein the resilient castor securing beams are engageable with a side surface of the respective castor in response to the insertion of the castor into the castor coupling member in order to secure the castor to the chassis foot member without the use of a tool.

14. The system of claim 13, wherein each castor coupling member defines a plurality of castor channels that house a portion of the respective castor when the castor is inserted in the castor coupling member and the castor securing beam is engaged with the side surface of the castor.

15. The system of claim 10, wherein each of the castor housing members extend from the chassis engagement surface on the chassis foot member and away from the floor engagement surface, though the chassis foot coupling feature, and into the IHS housing.

16. The system of claim 10, wherein the chassis coupling member extends from the castor housing member and engages the chassis foot coupling feature without the use of a tool to secure the chassis foot member to the IHS chassis.

17. The system of claim 10, further comprising:
a plurality of castors secured to the chassis foot member through the engagement of the plurality of castors with respective castor coupling members.

18. The system of claim 17, wherein less than half of the wheel on each castor extends past the floor engagement surface when the castors are secured to the chassis foot member and located in the castor housings.

19. A method for coupling a foot and a castor to a chassis, comprising:
providing a chassis foot member comprising a floor engagement surface and a plurality of castor housing members adjacent a chassis engagement surface that is located opposite the floor engagement surface on the chassis foot member, wherein a castor housing is defined between each castor housing member and the floor engagement surface, and wherein a chassis coupling member extends from each castor housing member adjacent the chassis engagement surface and a castor coupling member extends from each castor housing member adjacent the respective castor housing, and wherein each chassis coupling member comprises a resilient chassis securing beam and each castor coupling member comprises a resilient castor securing beam, the resilient chassis securing and castor securing beams being operable to snap into engagement with the chassis and a castor base member, respectively, in response to a sliding movement;
securing the chassis foot member to a chassis without the use of a tool by inserting the chassis coupling member through a chassis foot coupling feature defined by the chassis and, in response, engaging the resilient chassis securing beam with a securing aperture defined by the chassis; and increasing the mobility of the chassis in response to securing a plurality of castors to respective castor coupling members without the use of a tool by inserting each castor in the respective castor coupling member and, in response, engaging the resilient castor securing beam with a side surface of the castor, wherein each castor comprises a wheel, and only a portion of the wheel extends past the floor engagement surface when the castors are secured to the chassis foot member and located in the castor housings.

20. The method of claim 19, wherein less than half of the wheel on each castor extends past the floor engagement surface when the castors are secured to the chassis foot member and located in the castor housings.

* * * * *